United States Patent [19]

Freedman

[11] Patent Number: 5,168,234
[45] Date of Patent: Dec. 1, 1992

[54] METHOD AND APPARATUS FOR MEASURING AZIMUTHAL AS WELL AS LONGITUDINAL WAVES IN A FORMATION TRAVERSED BY A BOREHOLE

[75] Inventor: Robert Freedman, Houston, Tex.
[73] Assignee: Schlumberger Technology Corporation, Houston, Tex.
[21] Appl. No.: 579,435
[22] Filed: Sep. 7, 1990
[51] Int. Cl.⁵ .............................................. G01V 3/30
[52] U.S. Cl. .................................................. 324/338
[58] Field of Search ................................. 324/338–343

[56] References Cited

U.S. PATENT DOCUMENTS

| | | |
|---|---|---|
| 2,947,987 | 8/1960 | Dodington . |
| 3,286,163 | 11/1966 | Hosler et al. .............. 324/338 |
| 3,478,581 | 11/1969 | Runge ....................... 324/338 |
| 3,568,206 | 3/1971 | Sisson et al. . |
| 3,665,480 | 5/1972 | Fassett . |
| 3,849,721 | 11/1974 | Calvert . |
| 3,944,910 | 3/1976 | Rau . |
| 4,511,842 | 4/1985 | Moran et al. . |
| 4,575,728 | 3/1986 | Theobald et al. . |
| 4,578,645 | 3/1986 | Hoehn, Jr. . |
| 4,581,584 | 4/1986 | Baldwin . |
| 4,590,480 | 5/1986 | Nikolayuk et al. . |
| 4,704,581 | 11/1987 | Clark . |
| 4,857,852 | 8/1989 | Klienberg et al. .......... 324/338 |

OTHER PUBLICATIONS

H. A. Bethe, "Theory of Diffraction by Small Holes", The Physical Review, Oct. 1 and 15, 1944, Second Series, vol. 66, Nos. 7 & 8 pp. 163–182.
R. Freedman & J. P. Vogiatzis "Theory of Microwave Dielectric Constant Logging Using The Electromagnetic Propagation Method" Geophysics (May, 1979) 44, No. 5, 969–986.
W. C. Chew and Stanley C. Gianzero, "Theoretical Investigation of the Electromagnetic Propagation Tool," Trans, IEEE, On Geoscience And Remote Sensing (1981) GE-19, No. 1, 1–7.
K. Safinya, T. Habashy, C. Randall, B. Clark, and A. Perez-Falcon, "Experimental And Theoretical Study Of The Electromagnetic Propagation Tool in Layered And Homogeneous Media," SPEFE (Sept. 1987) 289–302.
Arnold Summerfeld, "Partial Differential Equations In Physics," Academic Press, New York and London (1949).
J. A. Kong, "Theory of Electromagnetic Waves," Wiley Interscience (1975).
G. N. Watson, "A Treatise On The Theory of Bessel Functions," Cambridge University Press, London (1945).

Primary Examiner—Walter E. Snow
Attorney, Agent, or Firm—Henry N. Garrana; John H. Bouchard

[57] ABSTRACT

A new type of microwave azimuthal wave propagation, never before known to exist, provides the basis for a new formation evaluation measurement for Electromagnetic Wave Propagation Tools (EPT). Although prior art tools measure longitudinally propagated waves which propagate in the formation along the direction of the longitudinal axis in the borehole, the newly discovered azimuthal waves propagate in the formation around the borehole. The new azimuthal waves propagate around the borehole like planewaves except for a spreading loss which is independent of the properties of the media. Measurements of phase shifts and attenuation between azimuthally spaced receivers determine formation azimuthal microwave dielectric properties. A new antenna configuration and a new method for determining azimuthal microwave dielectric properties is disclosed in this specification, the antenna configuration alternatingly measuring both longitudinal and azimuthl waves propagation thereby providing a new measurement with extremely high vertical resolution as compared to the resolution obtained by measuring longitudinal waves using prior art EPT tools.

24 Claims, 9 Drawing Sheets

○ z = 0.09 m
(1 cm OFFSET)

□ z = 0.08 m
(1.5 cm OFFSET)

△ z = 0.08 m
(2.0 cm OFFSET)

⬠ z = 0.075 m
(2.5 cm OFFSET)

○ z = 0.09 m

□ z = 0.08 m

△ z = 0.08 m

⬠ z = 0.075 m

METHOD AND APPARATUS FOR MEASURING AZIMUTHAL AS WELL AS LONGITUDINAL WAVES IN A FORMATION TRAVERSED BY A BOREHOLE

BACKGROUND OF THE INVENTION

This specification discloses, for the first time, a new type of electromagnetic wave which has never before been known to exist in the prior art and which results in the development of a new formation evaluation measurement, and more particularly, to a method and apparatus for receiving and measuring a newly discovered azimuthal electromagnetic wave in addition to the previously known longitudinal electromagnetic wave propagating in a formation traversed by a borehole.

Electromagnetic (EM) wave propagation tools (EPT) are used for investigating a formation traversed by a borehole and usually comprise one or more transmitters for transmitting electromagnetic energy into the formation and one or more receivers for sensing a signal propagating in the formation corresponding to the transmitted electromagnetic energy. The electromagnetic energy has been known to include longitudinally propagating electromagnetic waves. Prior art theoretical models of electromagnetic wave propagation tools in boreholes at microwave frequencies have assumed that the transmitting and receiving antennas are situated on an infinite metallic (flat) ground plane, and not on a curved plane. See, for example, U.S. Pat. No. 4,704,581 to Clark which appears to have made this same assumption which was made in connection with the prior art theoretical models. The physics of this assumption is based on the fact that the wavelengths of the EPT radiation in most rock formations of interest are small compared to the radius of curvature of the EPT antenna pad 0.1016 m). Therefore, since the transmitting and receiving antennas were assumed to be situated on an infinite flat plane, the prior art theoretical models did not lend themselves to the study and/or discovery of other than longitudinally propagating electromagnetic waves. In addition, solving the boundary value problems that must be confronted to theoretically investigate transmitter and receiver antenna pad curvature effects is considerably more complex than for planar (flat) geometry problems. Indeed, for planar layered media situated on an infinite metallic (flat) ground plane having dipole sources, solutions to the EM boundary value problems can be expressed in terms of Sommerfeld integrals and can be found in many textbooks on the subject. However, a search of the well logging and EM literature failed to locate published solutions to the two boundary value problems in this specification, which involve a curved antenna and receiver pad. Since the prior art models assumed that the transmitting and receiving antennas were situated on an infinite, flat metallic ground plane, there has been little impetus in the prior art to study any electromagnetic waves generated by EM transmitters other than longitudinally propagating waves. Therefore, the EPT tools of the prior art disclose transmitters which transmit and receivers which receive longitudinally propagating electromagnetic waves only.

SUMMARY OF THE INVENTION

Accordingly, it is a primary object of the present invention to disclose, for the first time, a new type of electromagnetic wave which has never before been known to exist in the prior art, the new electromagnetic wave being generated by a slot antenna emitting microwave energy into a formation traversed by a borehole.

It is a further object of the present invention to disclose, for the first time, the newly discovered electromagnetic wave, which new wave provides the basis for a new formation evaluation measurement.

It is a further object of the present invention to disclose a new apparatus for receiving and measuring the newly discovered electromagnetic wave.

It is a further object of the present invention to disclose a new azimuthally propagating electromagnetic wave in addition to the previously known longitudinally propagating wave, the reception and measurement of the new azimuthal wave by the new apparatus and method in accordance with the present invention, in addition to the reception and measurement of the previously known longitudinal wave, providing the basis for a new formation evaluation measurement.

It is a further object of the present invention to disclose a novel transmitter and receiver array designed to transmit and receive the newly discovered azimuthal wave in addition to the previously known longitudinal wave.

In accordance with these and other objects of the present invention, an endfire-type transmitter and receiver array apparatus is situated on a curved antenna pad and comprises a pair of longitudinally disposed transmitters and a pair of longitudinally disposed receivers located on a first longitudinal axis of a curved-surface transmitter and receiver antenna pad; however, in accordance with the present invention, an additional pair of longitudinally disposed transmitters are located on second and third longitudinal axes, respectively, spaced by an angle (phi-4) (see FIG. 8) from the first longitudinal axis for generating an azimuthal wave in the formation traversed by the borehole, and an additional pair of longitudinally disposed receivers are located on fourth and fifth longitudinal axes, respectively, spaced by an angle (phi-3) from the first longitudinal axis for receiving the azimuthal wave, where phi-3) is less than (phi-4). The additional pair of longitudinally disposed transmitters are disposed in a first cross sectional plane through the apparatus, and the additional pair of longitudinally disposed receivers are disposed in a second cross sectional plane, the second cross sectional plane being different than the first cross sectional plane and being offset by a value "z" from the first cross sectional plane. This endfire transmitter and receiver array measures a newly discovered azimuthal wave in addition to the previously known longitudinal wave. As a result, since some rock-properties in a formation change azimuthally and not longitudinally, measurement of the newly discovered azimuthal waves allows one to generate a new formation evaluation measurement representing the azimuthally oriented rock properties in the formation.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DESCRIPTION OF THE PREFERRED EMBODIMENT

Figure 1:
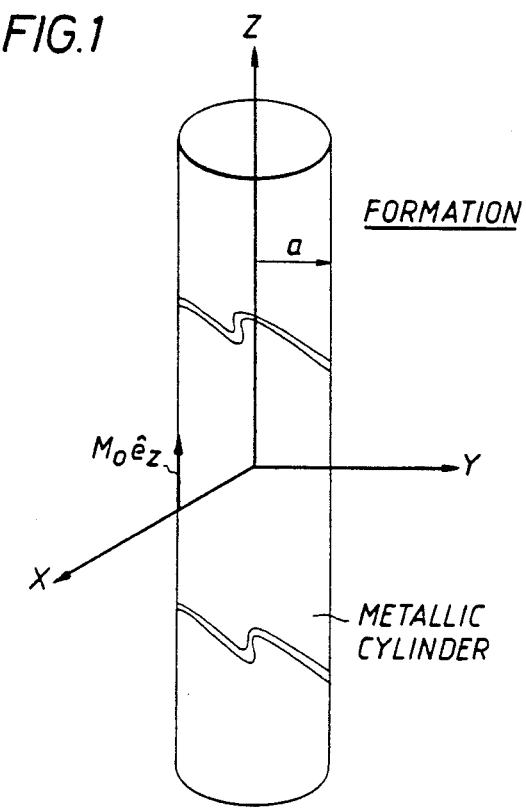
FIG. 1 illustrates a schematic of a theoretical model for a longitudinally oriented magnetic dipole transmitter, the transmitted used in an endfire transmitter and receiver array.

Electromagnetic wave propagation tools (EPT tools) of the prior art include two types of transmitter and receiver arrays: a broadside array which includes horizontally oriented transmitter and receiver antennas and an endfire array which includes vertically or longitudinally oriented transmitter and receiver antennas. One example of a prior art EPT tool is disclosed in U.S. Pat. No. 4,704,581 to Clark. In both types of arrays, the transmitters and receivers are all disposed on one longitudinal axis which is located on a curved surface of the EPT tool housing, the transmitters and receivers being adapted to contact a wall of a borehole in which the EPT tool is disposed. The surface of the EPT tool housing is curved in the azimuthal direction. As a result, technically, the transmitter and receiver antennas are disposed on a curved surface. However, since the wavelengths of the EPT radiation in most rock formations of interest are small as compared to the radius of curvature of the prior art EPT antenna pad, the transmitting and receiving antennas are deemed to be situated on a flat, metallic plane. If a flat, metallic plane is assumed to support the transmitter and receiving antenna pads, no azimuthal wave components can possibly exist. Therefore, since the transmitting and receiving antennas were deemed to be situated on a flat plane, the antennas were all located on one longitudinal axis. Therefore, prior art EPT models did not allow for the discovery or measurement of azimuthal waves.

In an EPT sonde including a transmitter and receiver array situated on a curved surface of the sonde, when the transmitter array includes at least one vertically oriented transmitter, it has been discovered that, in addition to a longitudinal wave, another separate and distinct wave propagates azimuthally in the formation around the antenna array. This new azimuthal wave provides the basis for a new formation evaluation measurement; that is, the new azimuthal wave may be measured for determining the anisotropy of the formation which can only be determined by comparing measurements of both the longitudinal and azimuthal waves. However, in order to generate and receive this newly discovered azimuthal wave, the transmitter and receiver array must be arranged on the curved surface of the sonde in a specific and predetermined manner which would allow the reception and measurement of both the longitudinal waves and the newly discovered azimuthal waves.

At a minimum, in order to generate and receive solely the newly discovered azimuthal waves, although other arrangements are possible, the new arrangement of the transmitter and receiver array on the curved surface of the antenna pad must include:

(1) at least one vertically oriented transmitter antenna located on a longitudinal axis disposed on a surface of the sonde; and (2) at least two receiver antennas displaced, respectively, by angles "phi-3" and "phi-4" from the transmitting antenna in the phi-direction and displaced by a value "Z1" from the transmitter antenna in the z-direction for receiving the newly discovered azimuthal waves; it is important that both receiver antennas be spaced from the transmitter antenna by the same value Z1; the receiver antennas may be either vertically (longitudinally) or transversely oriented.

Azimuthal wave measurements offer attractive new possibilities for formation evaluation. It has been determined, for certain relative positions of a transmitter and azimuthally displaced receiver pair, that azimuthal waves propagate between receivers like planewaves except for a geometrical spreading loss that is independent of the properties of the formation. Thus, measurements of azimuthal wave phase shifts and attenuations determine formation microwave dielectric properties; in addition, since the two receiver antennas (referenced in paragraph (2) hereinabove) displaced by angles phi-3 and phi-4 from the transmitting antenna are also displaced by the same Z1 value from the transmitting antenna, the vertical resolution of these measurements is an order of magnitude better than the resolution achieved by prior art EPT tools. Therefore, this new discovery (the existence of azimuthal waves) gives rise to a new formation evaluation measurement never seen before in the prior art.

Figure 2:
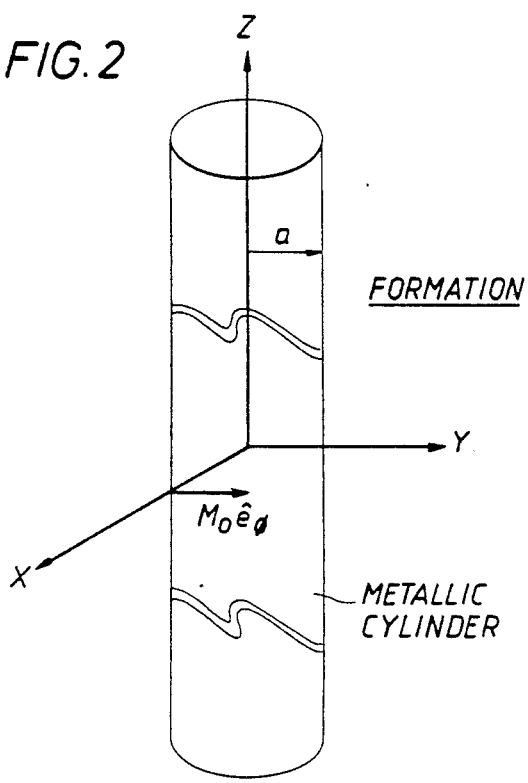
FIG. 2 illustrates a schematic of a theoretical model for a transversely oriented magnetic dipole transmitter.
Figure 2A:
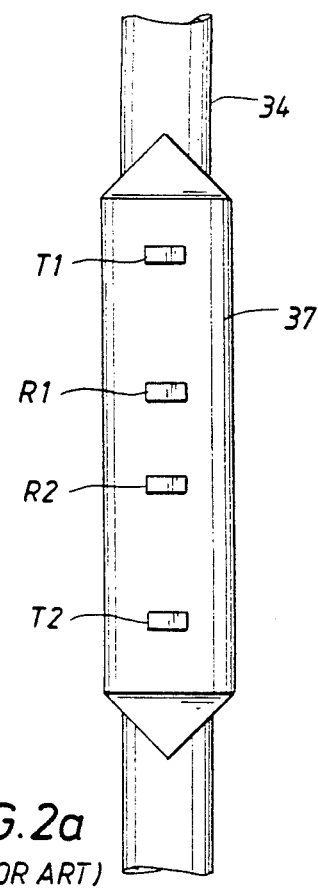
FIGS. 2a-2c illustrate prior art views of an induction sonde including/transversely oriented transmitter and receiver antennas.
Figure 2B:
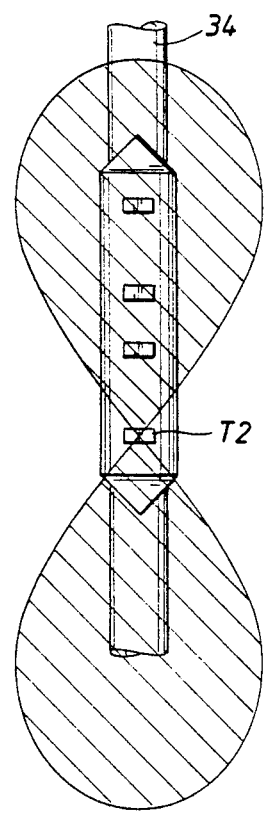
Figure 2C:
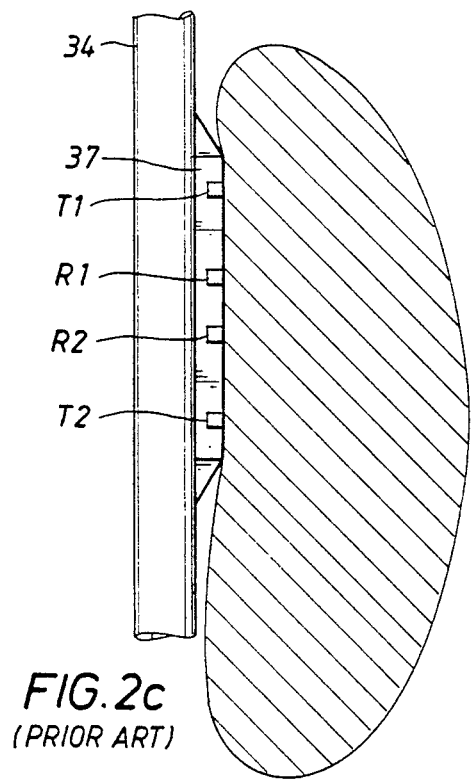
Figure 2D:
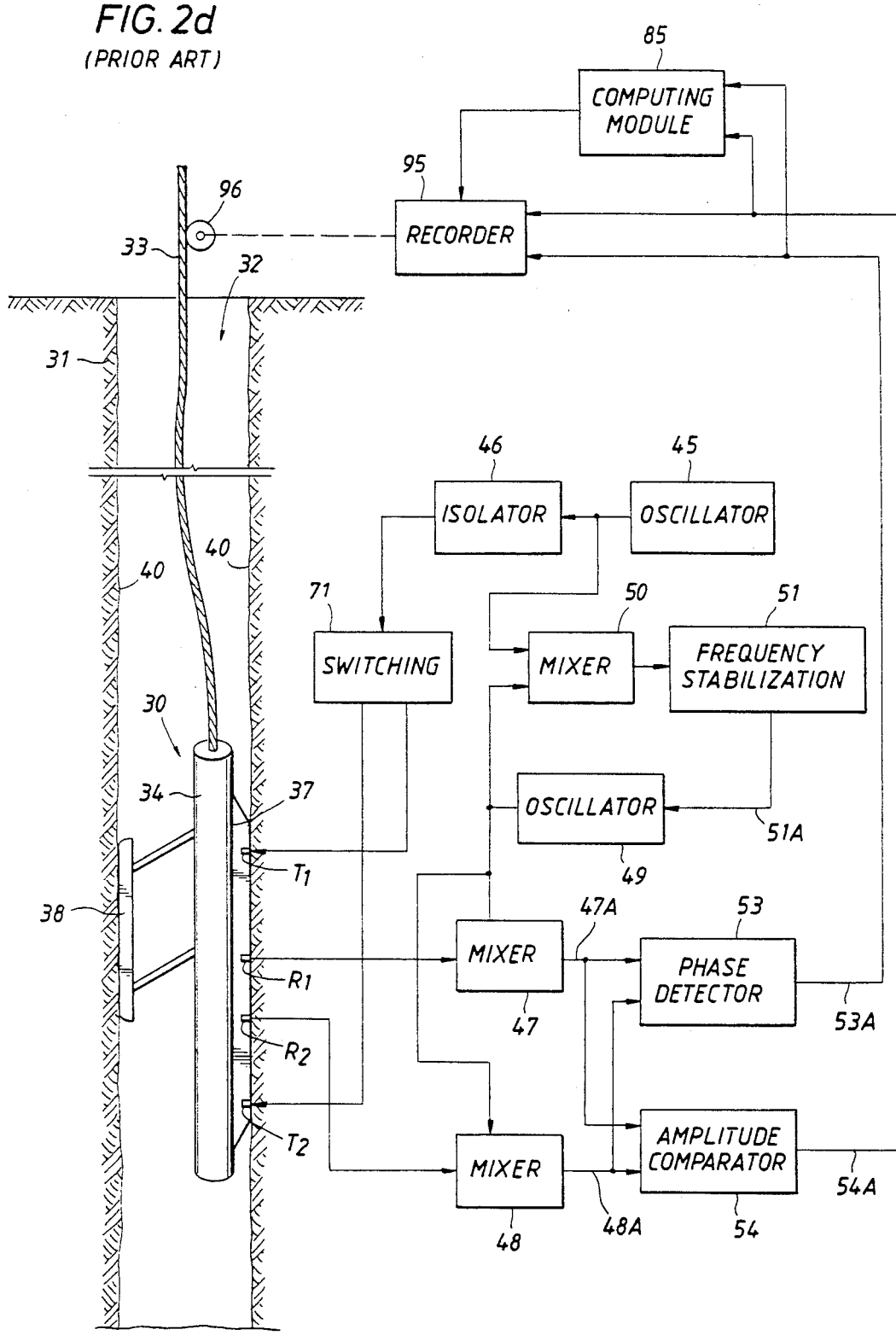
FIG. 2d illustrates a complete implementation of an EPT sonde disposed in a borehole including a transmitting apparatus and a receiving apparatus connected to the sonde.

Referring to FIG. 2d, a complete implementation of an EPT sonde disposed in a borehole including a transmitting apparatus and a receiving apparatus connected to the sonde is illustrated.

The EPT sonde of FIG. 2d including the transmitting and receiving apparatus is fully described and set forth in U.S. Pat. No. 4,704,581 to Clark, assigned to the same assignee as that of the present invention, the disclosure of which is incorporated by reference into this specification. The numerals used in FIG. 2d are also used in FIG. 1 in the Clark patent.

In FIG. 2d, a logging device 30 including a cylindrical sonde 34 is disposed in a borehole. Mounted on one side of sonde 34 is a pad 37 which contains, inter alia, vertically spaced transmitting antennas T1 and T2 and vertically spaced receiving antennas R1 and R2 between the transmitting antennas. A back up arm 38 is designed to maintain the pad 37 in contact with the borehole wall. Electronic signals indicative of information received by the receivers R1 and R2 are transmitted uphole via cable 33 to a computing module 85 and a recorder 95 typically located at a surface of the earth.

The electronics contained within the sonde 34 is also illustrated in FIG. 2d. An oscillator 45 provides output energy which is coupled through isolator 46 and switching circuit 71 to the transmitting antennas T1 and T2 respectively. Electromagnetic energy is transmitted from transmitter T1 into the formation. Energy received by receiving antennas R1 and R2 is respectively coupled to input terminals of mixers 47 and 48. The signals which arrive from R1 and R2 are out of phase with each other by an amount which depends upon the properties of the surrounding formation and have an amplitude ratio which also depends upon properties of the surrounding formations. The signals 47A and 48A are applied to a phase detector circuit 53 and to an amplitude comparator 54. The output of the phase detector 53 is a signal level which is proportional to the phase difference between the signals received at R2 and R1. The output of amplitude comparator 54 is a signal level which is proportional to the relative amplitude of the signal received at R2 with respect to the signal received at R1. The outputs of the phase detector 53 and the amplitude comparator 54 are transmitted to the surface over conductor pair 53A and 54A which, in actuality, is part of cable 33. The signals on lines 53A and 54A are recorded by recorder 95. These signals are also coupled to computing module 85, which determines the dielectric constant and/or conductivity of the formation in the borehole.

Figure 8:
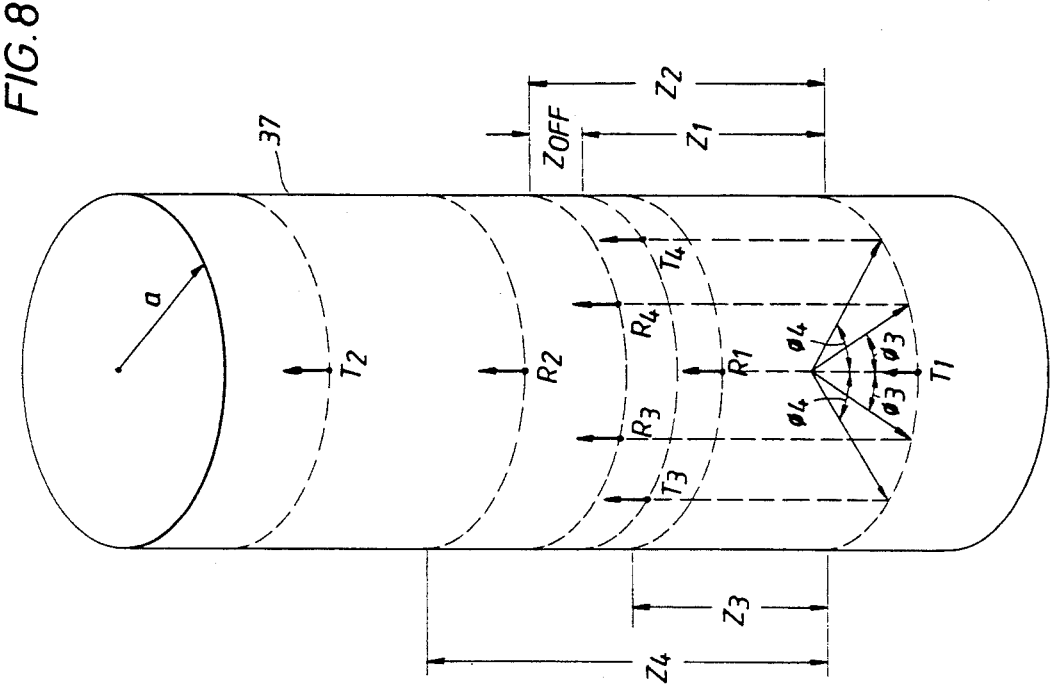
FIG. 8 illustrates a novel endfire transmitter and receiver array in accordance with the present invention for measuring the newly discovered azimuthal waves in addition to the previously known longitudinal waves.
Figure 3:
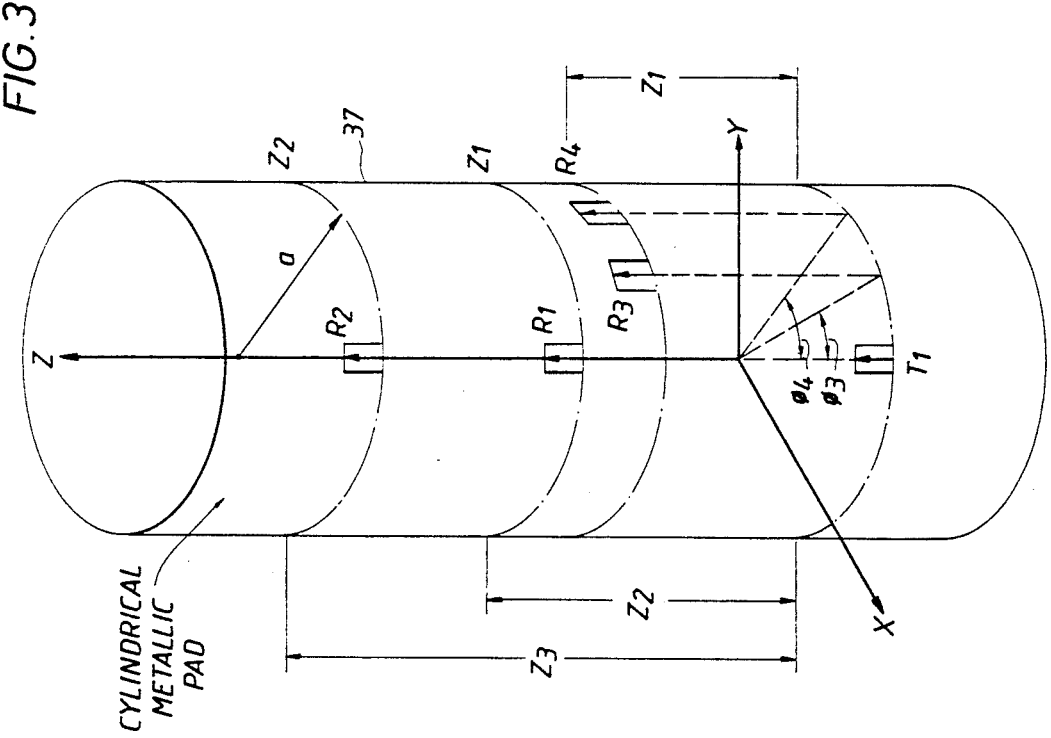
FIG. 3 illustrates a first transmitter receiver configuration, and in particular, a schematic of an antenna pad with longitudinally (R1-R2) and azimuthally (R3-R4) displaced receiver pairs.

The electronics referenced above, connected to the transmitting antennas T1, T2 and receiving antennas R1, R2 of FIG. 2d, may also be connected to transmitting antenna T1 of FIG. 3 or to the transmitting antennas T3 and T4 of FIG. 8 and to the receiving antennas R3 and R4 of FIGS. 3 and 8 for the purpose of transmitting electromagnetic energy from the transmitting antennas T1 or T3 and T4 into the formation and for receiving in the receiving antennas R3 and R4 the energy from the formation.

Figure 1A:
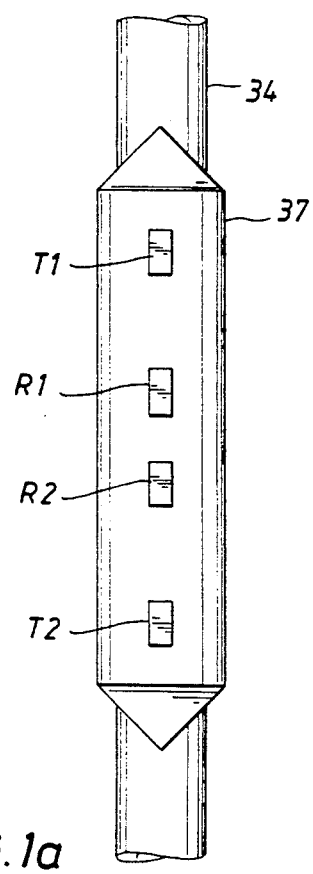
FIGS. 1a-1c illustrate prior art views of an EPT sonde including longitudinally oriented transmitter and receiver antennas.
Figure 1B:
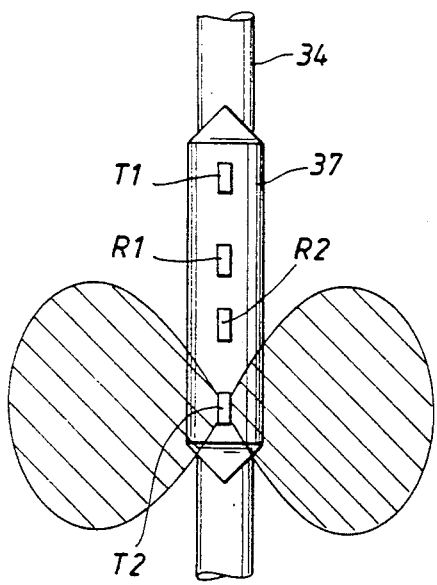
Figure 1C:
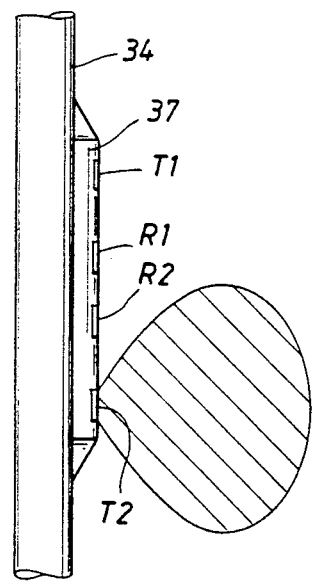

FIGS. 1a-1c illustrate the prior art antenna pad 37 of FIG. 2d. The prior art longitudinally (vertically) oriented transmitter antennas (T1 and T2) and longitudinally oriented receiver antennas (R1 and R2) are mounted on the antenna pad 37. Note that the transmitter and receiver antennas T1-T2 and R1-R2, respectively, are all located on the same longitudinal axis disposed on a surface of the antenna pad 37.

FIGS. 2a-2c also illustrate the prior art antenna pad 37 of FIG. 2d. The prior art transversely oriented transmitter antennas (T1 and T2) and transversely oriented receiver antennas (R1 and R2) are mounted on the antenna pad 37. Note that the transmitter and receiver antennas T1-T2 and R1-R2, respectively, are all located on the same longitudinal axis disposed on a surface of the antenna pad 37.

Referring to FIG. 3, an apparatus and method for generating azimuthal as well as longitudinal electromagnetic waves and for receiving the azimuthal and longitudinal waves, in accordance with one embodiment of the present invention, is illustrated.

In FIG. 3, similar to FIGS. 1a-1c, a pair of longitudinally oriented receivers R1 and R2 are located on the same longitudinal axis disposed on a surface of the antenna pad 37 (this longitudinal axis being hereinafter referred to as "the first longitudinal axis"). The antenna pad 37 has a curved surface of radius "a" from a center disposed on the z-axis. However, in accordance with the present invention, a longitudinally oriented transmitter T1 is disposed on the first longitudinal axis; and an additional pair of longitudinally oriented receivers R3 and R4 are located, respectively, on second and third longitudinal axes that are angularly disposed by angles phi-3 and phi-4, respectively, from the first longitudinal axis, receivers R3 and R4 each being displaced by a value "Z1" from the transmitter T1 along the z-axis.

In order for the embodiment of invention shown in FIG. 3 to transmit and receive azimuthal waves, the transmitter T1 must be a longitudinally (vertically) oriented antenna element; however, the receivers R1-R4 may be either longitudinally oriented or transversely oriented antenna elements; in addition, the receivers R3 and R4 must be disposed by angles phi-3 and phi-4 from transmitter T1 and should preferably be disposed by the same value Z1 from transmitter T1 along the z-axis.

In operation, referring to FIG. 3, the transmitter T1 generates longitudinal and azimuthal waves in response to signals generated by the circuit shown in FIG. 2d. The receivers R1 and R2 receive the longitudinal waves. However, since the receivers R3 and R4 are disposed by angles phi-3 and phi-4 from transmitter T1, and are disposed by the same value Z1 from transmitter T1 along the z-axis, the receivers R3 and R4 receive the azimuthal waves. The signals received by receivers R1-R4 are transmitted to a surface of the well in the manner described and illustrated with reference to FIG. 2d of the drawings.

Referring to FIG. 8, an apparatus and method for transmitting and receiving azimuthal as well as longitudinal electromagnetic waves in accordance with another embodiment of the present invention is illustrated.

In FIG. 8, the apparatus for transmitting and receiving azimuthal and longitudinal waves includes a transmitter T1 situated on a first longitudinal axis located on the curved surface of the antenna pad 37 for transmitting longitudinal waves; a transmitter T2 also situated on the first longitudinal axis of antenna pad 37 for transmitting other longitudinal waves; receivers R1 and R2 situated on the first longitudinal axis of antenna pad 37 for receiving the longitudinal waves transmitted from transmitters T1 and T2, the receivers R1 and R2 measuring the phase shift and attenuation which occurs between receiver R1 and R2; transmitters T3 and T4 offset by a value Z1 from the transmitter T1 along the z-axis for transmitting the newly discovered azimuthal waves, each transmitter T3 and T4 being angularly offset by angle phi-4 from transmitter T1; and receivers R3 and R4 offset by a value Z2 from transmitter T1 along the z-axis for receiving the azimuthal waves, receivers R3 and R4 being angularly offset by an angle phi-3 from transmitter T1. Transmitters T3 and T4 can be (but need not be) offset along the z-axis by a value "ZOFF" from receivers R3 and R4. In FIG. 8, all transmitters and receivers have longitudinally (vertically) oriented antenna elements.

At a minimum, in FIG. 8, for the apparatus to operate properly in transmitting and receiving the azimuthal waves in addition to the longitudinal waves, transmitters T3 and T4 must have longitudinally oriented antenna elements; all the remaining transmitters and receivers may have either longitudinally or transversely oriented antenna elements. In addition, receivers R3 and R4 must be angularly offset from transmitter T1 by angle phi-3; transmitters T3 and T4 must angularly offset from transmitter T1 by angle phi-4, where angle phi-4 is greater than angle phi-3; and transmitters T3 and T4 can be (but need not be) offset from receivers R3 and R4 by the value ZOFF.

In operation, referring to FIG. 8, the following functional operation take place in the following sequence:

(1) transmitter T1 transmits a longitudinal wave, and receivers R1 and R2 measure the phase shift and attenuation of the longitudinal wave between receivers R1 and R2; at this time, transmitters T2-T4 do not transmit, and receivers R3-R4 do not receive;

(2) transmitter T2 transmits a longitudinal wave, and receivers R1 and R2 measure the phase shift and attenuation of the longitudinal wave between receivers R1 and R2; at this time, transmitters T1, T3-T4 do not transmit, and receivers R3-R4 do not receive;

(3) transmitter T3 transmits an azimuthal wave and receivers R3 and R4 measure the phase shift and attenuation of the azimuthal wave between receivers R3 and R4; at this time, transmitters T1-T2 and T4 do not transmit and receivers R1-R2 do not receive; and (4) transmitter T4 transmits an azimuthal wave and receivers R3 and R4 measure the phase shift and attenuation of the azimuthal wave between receivers R3 and R4; at this time, transmitters T1-T2 and T3 do not transmit and receivers R1-R2 do not receive.

DETAILED DESCRIPTION OF THE PREFERRED EMBODIMENT

This specification discloses two new theoretical models in FIGS. 1 and 2 for Electromagnetic Wave Propagation (EPT) tools; however, only the model shown in FIG. 1 predicts a new type of azimuthal wave propagation. The model shown in FIG. 2 does not propagate azimuthal waves. Azimuthal waves have not been studied either experimentally or theoretically in the prior art. Azimuthal wave measurement could provide a new formation evaluation measurement. In addition, azimuthal wave measurements are extremely high resolution measurements compared to longitudinal measurements by prior art EPT tools. Measurements of both longitudinal and azimuthal waves provide information about formation anisotropy. Complementary measurements of both longitudinal and azimuthal waves using a new EPT antenna configuration to generate and receive these waves is disclosed in this specification.

The new models are shown schematically in FIGS. 1 and 2. The two net models are for (1) a longitudinally oriented point magnetic dipole transmitter situated on a metallic cylindrical pad and (2) a transversely oriented point magnetic dipole transmitter situated on a metallic cylindrical pad. The solution of the models in a homogeneous medium for both orientations is summarized in Appendix A. The formulas in Appendix A give $H_z(a, \phi, z)$ for the longitudinally oriented transmitter and $H_\phi(a, \phi, z)$ for the transversely oriented transmitter where a is the radius of the cylindrical pad. These formulas permit the tool response to be computed for receivers situated at any positions on the pad denoted by $(a, \phi, z)$ in cylindrical coordinates. These formulas have ben used to computer apparent traveltimes $t_{pla}$ and total attenuations as described in Appendix B.

It is instructive to briefly review the theoretical models previously used to compute EPT tool responses. Previous theoretical models of Electromagnetic (EM) Wave Propagation tools in borehole at microwave frequencies have assumed that the transmitting and receiving antennas are situated on an infinite metallic ground plane [2-4]. The physics of this assumption is based on the fact that the wavelengths of the EPT radiation in most rock formations of interest are small compared to the radius of curvature of the EPT antenna pad (0.1016 m). For this reason there has been little impetus to study models with curved antenna pads. Another, perhaps more compelling, reason is that solving the boundary value problems that must be confronted to theoretically investigate pad curvature effects is considerably more complex than for planar geometry problems. Indeed, for planar layered media with dipole sources, solutions to the EM boundary value problems can be expressed in terms of well-known Sommerfeld integrals and can be found in many elementary textbooks on the subject[5,6]. On the other hand, a search of the well logging and EM literature by the author failed to find published solutions to the two boundary value problems discussed in Appendix A. The detailed solutions of these problems will be published in separate reports.

Properties of Longitudinal And Azimuth Waves

I have found that at microwave frequencies, both longitudinal and azimuthal propagating waves are excited by a longitudinally oriented transmitter. The azimuthal waves propagate in homogeneous media like planewaves between suitably positioned receivers with spreading losses that are independent of the properties of the media. On the other hand, computations have shown that a transversely oriented transmitter excites only propagating longitudinal waves. The longitudinal waves travel in the formation along the direction of the borehole whereas the azimuthal waves propagate around the borehole.

Commercial EPT tools have transmitter-receiver configurations that are positioned to measure longitudinal wave properties (i.e., phase shifts and attenuations). Experimental tools like the Micro Dielectric Scanning Tool (MDST) measure longitudinal wave propagation using a 2-d matrix of longitudinally configured transmitter-receiver arrays[7-8]. The different transmitter-receiver configurations needed to measure longitudinal and azimuthal wave properties are illustrated in FIG. 3. Here a schematic (not to scale) of a cylindrically shaped antenna pad with a single longitudinally oriented transmitter ($T_1$) and two pairs of receivers is shown. In an actual tool the transmitters and receivers in FIG. 3 would be non-resonant slot antennas[9] like those used in the EPT-G Endfire tools or the MDST laboratory tool. The configuration $T_1$-$R_1$-$R_2$ is identical to that used by the EPT-G Endfire tool (note that only the lower transmitter is shown) to measure the properties of longitudinal waves. The configuration $T_1$-$R_3$-$R_4$ can be used to measure azimuthal wave properties. The receivers, $R_3$ and $R_4$, are located at positions (a, $\phi_3$, z) and a,$\phi_4$,z) relative to the transmitter located at (a, 0, 0). Note that the z-coordinates of the azimuthally displaced receivers are identical.

Detailed computer simulations of azimuthal wave propagation in homogeneous media with complex propagation constants, $k=k'+ik''$, lead to the following findings. Let a pair of azimuthally displaced receivers be positioned at (a, $\phi_1$, z) and (a, $\phi_2$, z) relative to a transmitter at (a, 0, 0). If $\Delta\Phi$ is the phase shift of the signal detected at the receivers, then for suitable relative positions of the transmitter and receivers, one finds that, $$\Delta\Phi \simeq a(\phi_2-\phi_1)k', \qquad (1)$$

where a is the radius of curvature of the antenna pad. Likewise, if EATT denotes the total attenuation of the signal between the receiver pair then, $$EATT \simeq 8.686 k'' + A_s(\phi_1, \phi_2, z), \qquad (2)$$

in dB/m where $A_s$ is the spreading loss. The spreading loss depends on the relative positions of the transmitter and receiver pair and, fortunately, is only weakly dependent on the dielectric properties of the medium. This means that a spread loss correction can be made for azimuthal wave propagation, and in light of Eqs. (1) and (2), formation microwave dielectric properties can be obtained from measuring phase shifts and total attenuations between a pair of azimuthally displaced receivers. The proper relative positions of a transmitter and receiver pair that are required in order that Eqs. (1) and (2) be valid are determined by computer simulations using Eq. (A.7) from Appendix A and Eqs. (B.5) and (B.7) from Appendix B. Some examples are discussed in the next section. Before concluding this section, it is important to note that the effects of standoff on the azimuthal and longitudinal wave propagated by a longitudinally oriented magnetic dipole transmitter have also been investigated and will be reported in a forthcoming report. Computations show that the azimuthal waves propagate in the presence of thin standoffs or mudcakes with traveltimes representative of the invaded zone properties and are, therefore, not evanescent surface waves. The validity of Eqs. (1) and (2) places the azimuthal waves on the same theoretical footing as the longitudinal waves measured by commercial EPT tools. This represents a remarkable and surprising discovery.

Computer Simulations

Figure 4:
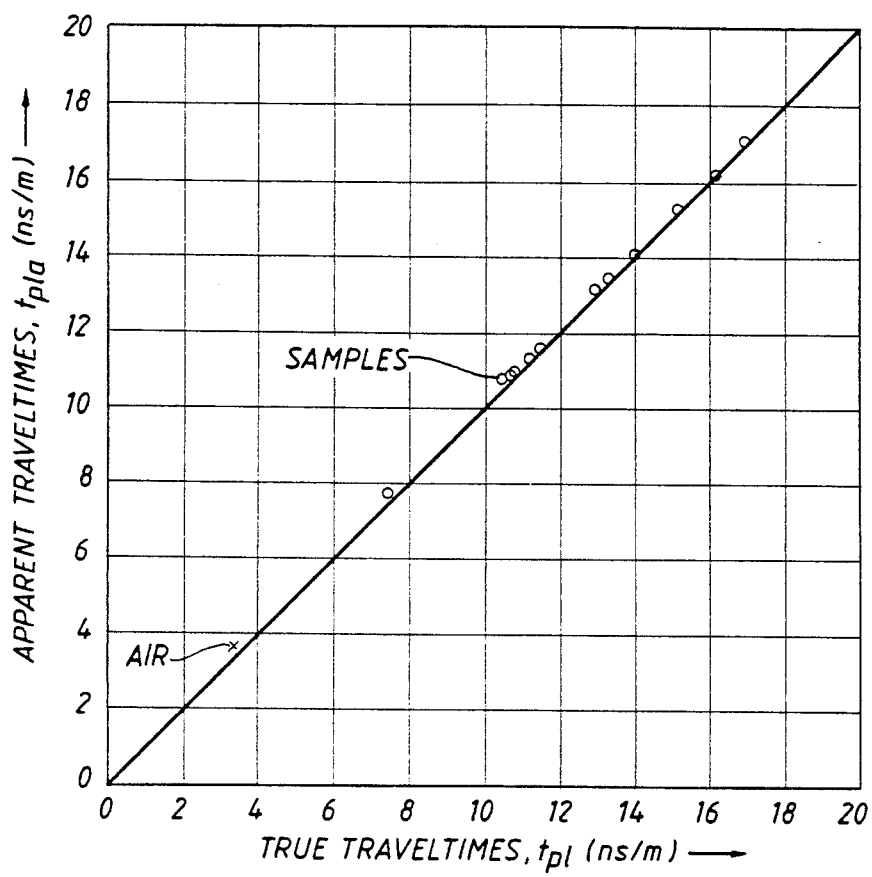
FIG. 4 illustrates a comparison of apparent and true formation traveltimes for the suite of samples in table 1 in the specification associated with azimuthally propagated waves and the first transmitter receiver configuration of FIG. 3.

The results of some computer simulations of azimuthal wave propagation are given below to illustrate the validity of Eqs. (1) and (2) and also to illustrate the dependence of the results on the relative positions of the transmitter and receivers. In FIG. 4, a comparison of apparent traveltimes ($t_{pla}$) and true formation traveltimes ($t_{pl}$) is shown for the suite of sample rock properties in Table 1.

The microwave dielectric properties of this suite of samples covers the range normally encountered in petroleum formations. The $t_{pl}$ of the samples are computed from Eq. (B.1) and the $t_{pla}$ are computed from the model using Eqs. (B.3)–(B.5), (A.7) and (A.8). In FIG. 4, note that the receivers are at azimuthal positions ($\phi_1$, $\phi$)=(45, 90) degrees and that the receivers are offset 4 cm in the z-direction from the transmitter. The effect of the offset on azimuthal wave propagation will be discussed in the examples given below.

Figure 5:
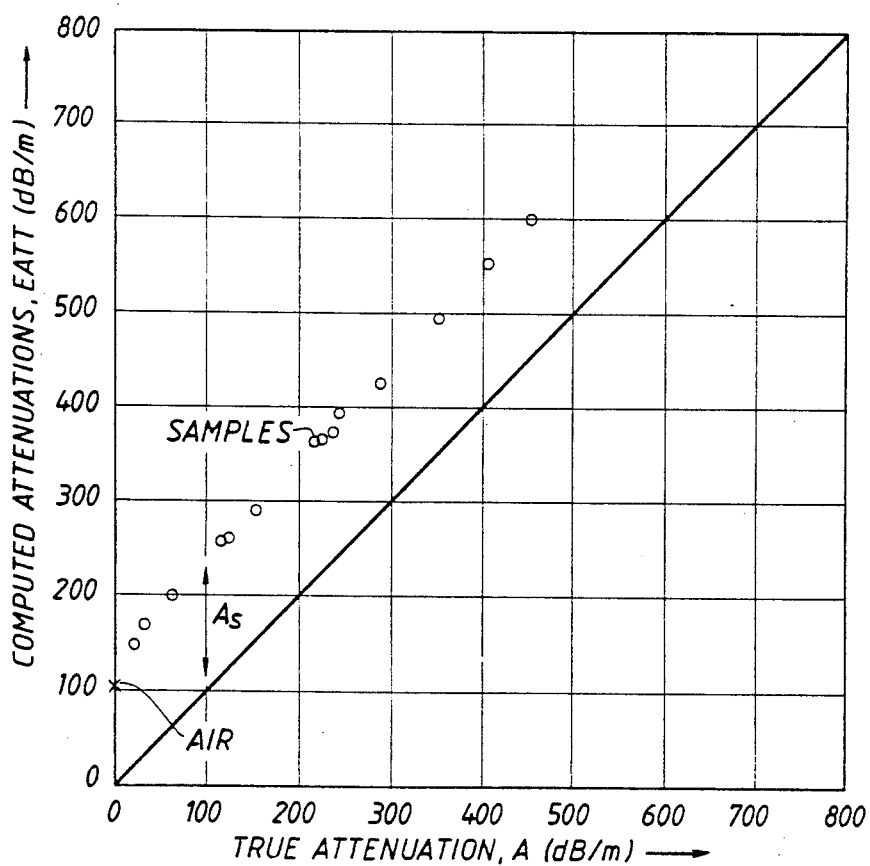
FIG. 5 illustrates a comparison of total and true attenuations for the suit of samples in table 1 associated with azimuthally propagated waves and the first transmitter receiver configuration.
Figure 6:
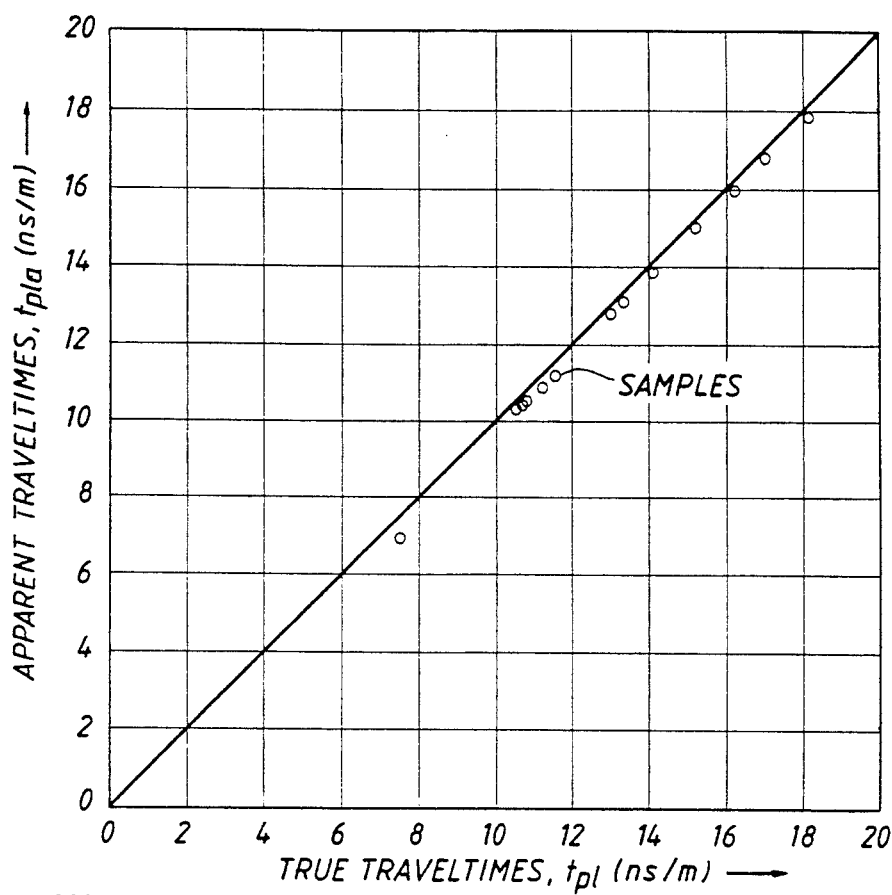
FIG. 6 illustrates a comparison of apparent and true formation traveltimes for the suite of samples in table 1 associated with azimuthally propagated waves and a second transmitter receiver configuration which is different than the first transmitter receiver configuration.
Figure 7:
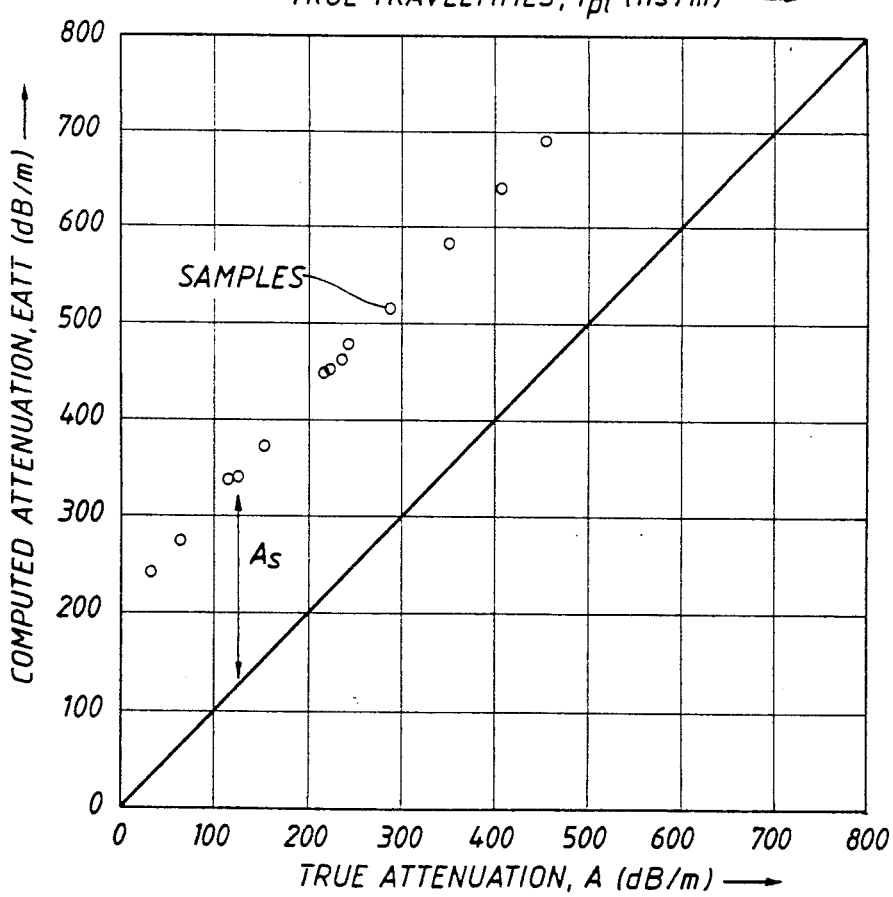
FIG. 7 illustrates a comparison of total and true attenuations for the suite of samples of table 1 associated with azimuthally propagated waves and the second transmitter receiver configuration.

The excellent agreement between $t_{pl}$ and $t_{pla}$ seen in FIG. 4 is remarkable considering the distant azimuthal placement of the receivers relative to the transmitter. It is perhaps helpful to not that an azimuthal displacement of 22.5° on a cylindrical pad with a 4 in. (0.1016 m) radius of curvature corresponds to a 4 azimuthal separation between the receivers. The results in FIG. 4 demonstrate the validity of Eq. (1) above, which can be readily verified from Eqs. (B.1), (B.3) and (B.4). In FIG. 5, a comparison of total attenuations EATT and true formation attenuations A for the same antenna configuration as in FIG. 4 is shown. Note that the spreading losses $A_s$ are essentially independent of the sample properties, thus validating Eq. (2), and are in the approximate range 125–150 dB/m for this particular antenna configuration. In FIGS. 6 and 7, I display results which are also described by Eqs. (1) and (2) but for a different transmitter-receiver configuration and a smaller offset in the z-direction.

Before preceding with a few more examples, I would like to first clarify a point. It might be tempting to equate, in some sense, (especially for small or zero offsets in the z-direction) azimuthal wave propagation with the more familiar "broadside" propagation between a transversely oriented transmitter and transversely oriented receivers.

TABLE 1

| Samples | Dielectric Constants | Loss Tangents |
| --- | --- | --- |
| 1 | 5.0 | 0.1 |
| 2 | 10.0 | 0.1 |
| 3 | 10.0 | 0.2 |
| 4 | 10.0 | 0.4 |
| 5 | 10.0 | 0.5 |
| 6 | 10.0 | 0.8 |
| 7 | 10.0 | 1.0 |
| 8 | 15.0 | 0.3 |
| 9 | 15.0 | 0.6 |
| 10 | 15.0 | 1.0 |
| 11 | 20.0 | 0.5 |
| 12 | 20.0 | 1.0 |
| 13 | 25.0 | 0.5 |

TABLE 1-continued

| Samples | Dielectric Constants | Loss Tangents |
|---|---|---|
| 14 | 25.0 | 1.0 |

This analogy is incorrect because the different orientations of the transmitter dipole with respect to the cylinder axis leads to solutions of the wave equations with different symmetry properties. The spreading losses, for example, for the two situations are quite different.

The example that follows illustrates the dependence of the azimuthal wave propagation characteristics on the z-offset of the transmitters from the receiver pair. In FIG. 8, an antenna pad with an array $T_1$-$R_1$-$R_2$-$T_2$ for measuring longitudinal waves and an array $T_3$-$R_3$-$R_4$-$T_4$ for measuring azimuthal waves is shown. Locating the receivers $R_3$ and $R_4$ between $R_1$ and $R_2$ provides a common measure point. The two transmitters for the azimuthally displaced receivers can be alternately pulsed to provide, as in commercial EPT tools, compensation for variably thick standoffs or mudcakes and also for electronic drifts and other instabilities[9].

Figure 9:
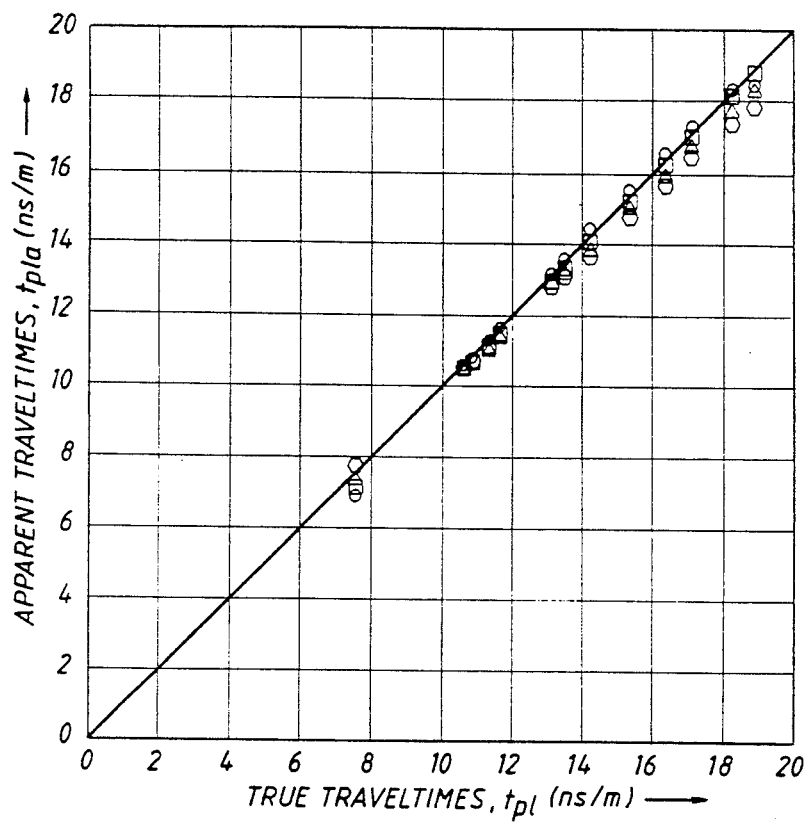
FIG. 9 illustrates a comparison of apparent and true traveltimes associated azimuthally propagated waves showing the dependence on z-offset for the suite of samples in table 1.
Figure 10:
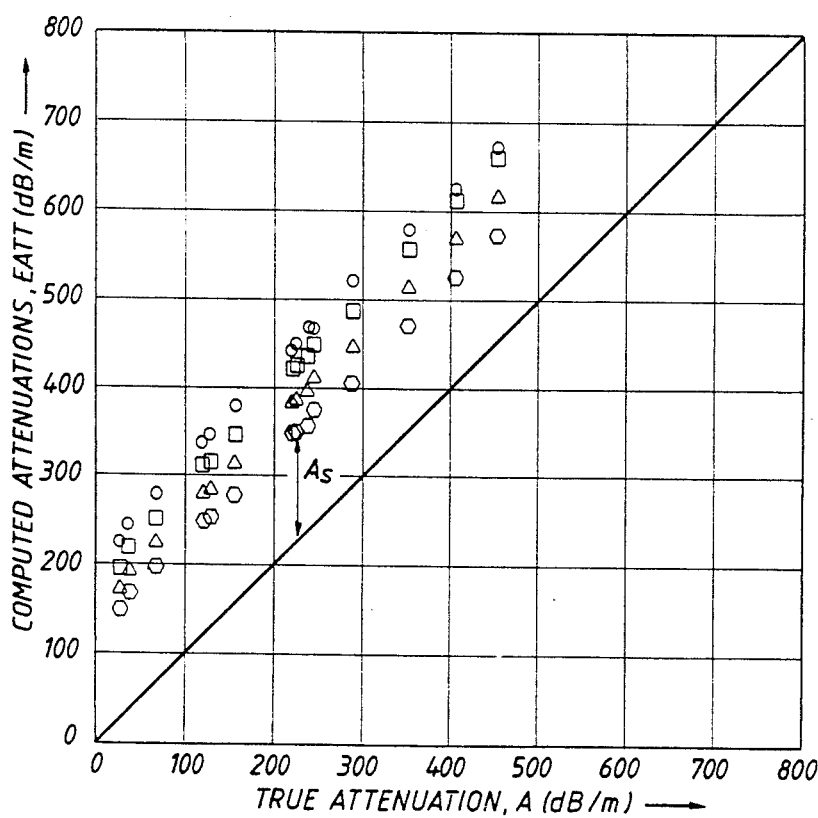
FIG. 10 illustrates a comparison of total and true attenuations associated with azimuthally propagated waves showing the dependence on z-offset for the samples in table 1.

In these examples, the positions of the antennas are specified relative to $T_1$ which is located at (a, 0, 0). In this example, I consider a longitudinal array for which $R_1$ is at (a, 0, 0.08), $R_2$ at (a, 0, 0.12), and $T_2$ at (a, 0, 0.20) where the z-spacings are in m. Note that this array has spacing identical to those of the EPT-G Endfire array. The azimuthal array receivers $R_3$ and $R_4$ are situated at (a, −4.22, 0.10) and (a, 4.22, 0.10), respectively where the azimuthal angles are in degrees. The azimuthal array transmitters $T_3$ and $T_4$ are located at (a, −29.53, z) and (a, 29.53, z), respectively. In this example, the azimuthal receiver pair separation is 1.5 cm and the near and far receiver azimuthal distances from the transmitter are 4.5 and 6.0 cm, respectively. In FIG. 9, comparisons of apparent and true traveltimes for four different z-offsets are shown. Note that the best agreement between $t_{pla}$ and $t_{pl}$ is obtained, in this example, for a z-offset of 1.5 cm. In FIG. 10, comparisons of total and true formation attenuations for the four different z-offsets in FIG. 9 are shown. Note how the spreading loss decrease with increasing z-offset while remaining weakly dependent on the properties of the medium. Note that the signal strength at the receivers increases with decreasing z-offset which would mitigate the increased spread loss.

Figure 11:
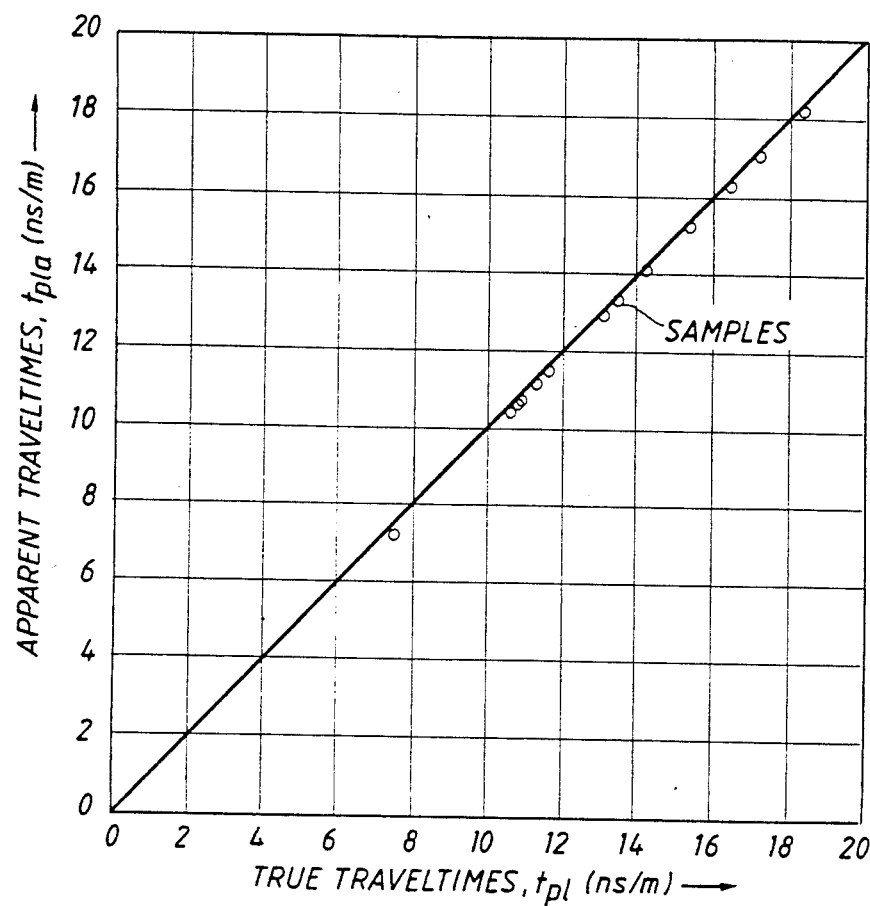
FIG. 11 illustrates a comparison of apparent and true formation traveltimes associated with longitudinally propagated waves for the suite of samples in table 1.
Figure 12:
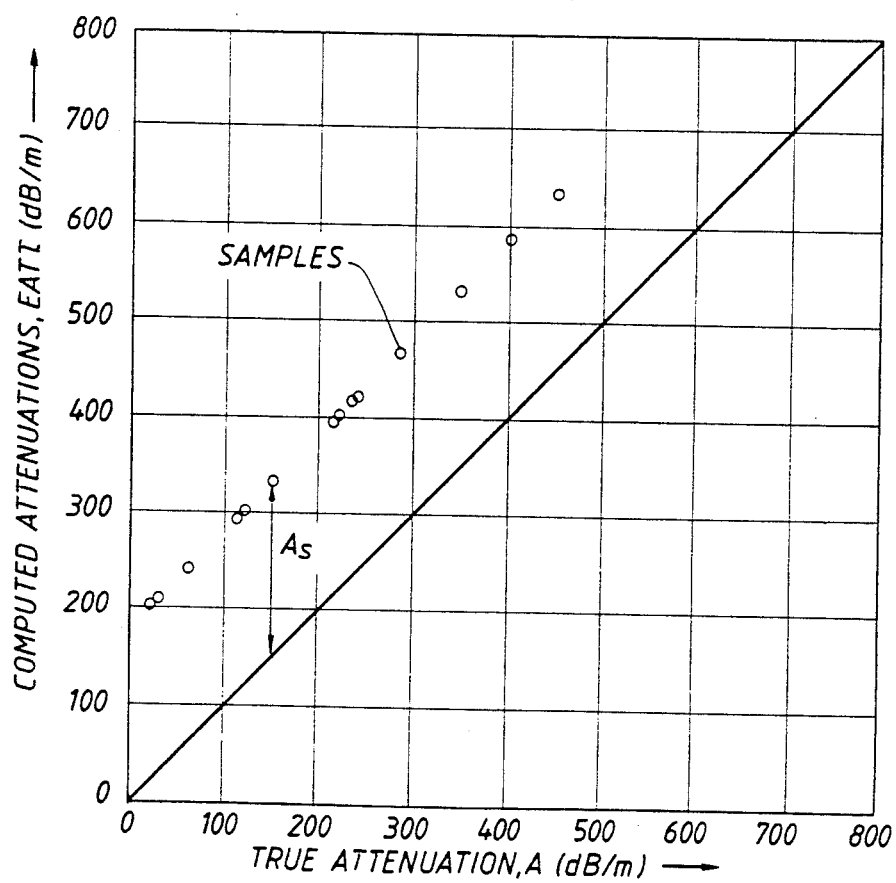
FIG. 12 illustrates a comparison of total and true attenuations associated with longitudinally propagated waves for the suite of samples in table 1.

In FIG. 11, comparisons of apparent and true traveltimes for longitudinal waves propagated using the array $T_1$-$R_1$-$R_2$-$T_2$ are shown. The apparent traveltimes were computed using Eqs. (A.7), (B.3) and (B.6). In FIG. 12, comparisons of true and apparent attenuations for longitudinal wave propagation are shown for the same antenna configuration as in FIG. 12.

Formation Evaluation

Alternately measuring both longitudinal and azimuthal waves using a tool with slot antennas configured, for example, like those shown in FIG. 8 would provide both longitudinal and azimuthal formation dielectric properties.

Azimuthal wave measurements would provide extremely high vertical resolution since the receivers are at the same measured depth. This can be better appreciated by noting that the present EPT tools (both EPT-G and EPT-D) measure both phase shift and attenuation at a sampling rate of 60 cps. For a logging tool moving at 1800 ft/hr, a sample is acquired each 0.1 in., which for point receivers would be the vertical resolution of the azimuthal measurement. In practice, the vertical resolution of the azimuthal waves would be determined by the finite size of the slot antennas. This would represent an order of magnitude improvement in vertical resolution compared to commercial EPT tools whose vertical resolution is determined essentially by the spacing between the receivers (4 cm) and is of the order of 5 cm. The extremely high vertical resolution would be comparable to that of the FMS. This degree of resolution is important for evaluation of, for example, sands deposited in deep water environments. In these turbidite formations, which are of current exploration interest in the Offshore Gulf Coast and also Onshore California, the objectives are sand-shale sequences with sand thicknesses of the order of 0.1-0.2 in which can not be evaluated using commercial EPT tools.

The differences in formation dielectric properties determined from longitudinal and azimuthal wave propagation would provide information about structural and stratigraphic anisotropy. The azimuthal waves would be sensitive to vertical fractures which must be present in order to obtain commercial production rates from many carbonate formations with low matrix permeabilities.

APPENDIX A

Summary of Models And Tool Response Formulas In Homogeneous Media

This Appendix presents formulas for the magnetic field components on the surface of a metallic cylindrical pad. These formulas were used to compute the results presented in this report. The detailed derivations of these formulas will be reported elsewhere. The magnetic fields are excited by longitudinally and transversely oriented point magnetic dipole transmitters situated on the pad. The two magnetic field components of interest here are: (1) $H_z$ due to a longitudinally oriented transmitter and (2) $H_\phi$ due to a transversely oriented transmitter. It can be shown that the tool signal for longitudinally (transversely) oriented transmitters and receivers is proportional to $H_z(H_\phi)$ evaluated at the receivers. A summary of the models and their solutions is given below.

Boundary Value Problems

Wave Equations

The magnetic field components are obtained by solving the following boundary value problems. Consider a cylindrical co-ordinate system, (r, $\phi$, z) and let $\hat{e}_r$, $\hat{e}_\phi$, and $\hat{e}_z$ denote unit vectors along the co-ordinate axes. The EM fields are obtained by solving the vector wave equation satisfied by the magnetic Hertz vector, $\vec{\pi}^{(m)}$. For a transversely oriented transmitter, $$\nabla^2 \vec{\pi}^{(m)} + k^2 \vec{\pi}^{(m)} = \frac{-M_0 \delta(r - r_0)\delta(\phi)\delta(z)}{r} \hat{e}_\phi, \quad (A.1)$$

where $M_0$ is the dipole moment of the transmitter which is located at, $(r_0, 0, 0)$, where, $r_0 \geq a$, and a is the radius of the cylindrical pad. In the above equation, k is the complex propagation constant of the medium. The time dependence of the transmitter current is, without loss of generality, assumed to be of the form, $e^{-i\omega t}$, where, $i = \sqrt{-1}$, and, $\omega = 2\pi f$, with f the transmitter frequency (equal to 1.1 GHz for the SPT). In Eq. (A.1), $k = \omega\sqrt{\mu_0\epsilon}$, where the scalar complex permittivity is given by, $\epsilon = \kappa\epsilon_0 (1.0 + i\tan\delta)$, where $\mu_0$ and $\epsilon_0$ are the magnetic permeability and permittivity of a vacuum. The properties of the homogeneous media (assumed non-magnetic and isotropic) considered here can therefore be described by their relative dielectric constants, $\kappa$, and loss tangents, $\tan\delta$. In Eq. (A.1), it can be shown that the boundary conditions on the Em field vectors can be satisfied using a Hertz vector with two non-zero components, i.e., $\vec{\pi}^{(m)} = (\pi_r^{(m)}, \pi_\phi^{(m)}, 0)$. The vector operator $\nabla^2$ in the wave equation (A.1) couples these two components leading to two coupled partial differential equations. This results, even in a homogeneous medium, in EM waves with non-zero values for all of the components of the magnetic, $\vec{H}$, and electric field vectors, $\vec{E}$.

The vector wave equation for a longitudinally oriented transmitter reduces to a scalar wave equation. That is, it can be shown that the wave equation and the boundary conditions can be satisfied in a homogeneous medium by a Hertz vector of the form, $\vec{\pi}^{(m)} = (0, 0, \pi_z^{(m)})$. Thus, the scalar wave equation for a longitudinally oriented transmitter assumes the form, $$\nabla^2 \pi_z^{(m)} + k^2 \pi_z^{(m)} = \frac{-M_0 \delta(r - r_0)\delta(\phi)\delta(z)}{r}, \quad (A.2)$$

where all quantities in Eq. (A.2) have been defined above.

EM Fields And Boundary Conditions

The EM fields are computed from the magnetic Hertz vectors. The fields, outside the sources, are for the electric field given by, $$\vec{E} = i\omega\mu_0 \nabla \times \vec{\pi}^{(m)}, \quad (A.3)$$

and for the magnetic field, $$H = \frac{1}{i\omega\mu_0} \nabla \times \nabla \times \vec{\pi}^{(m)}. \quad (A.4)$$

The boundary conditions on the Hertz vectors in Eqs. (A.1) and (A.2) are easily derived from Eqs. (A.3) and (A.4) and the boundary conditions satisfied by the EM fields. In a homogeneous medium, the boundary condition is that $\vec{E}_\phi \vec{E}_z = 0$ at $r = a$, i.e., using Eq. (A.3)

$$(\nabla \times \vec{\pi}^{(m)}) \cdot \vec{e}_\phi = 0, \quad (A.5)$$

and $$(\nabla \times \vec{\pi}^{(m)}) \cdot \vec{e}_z = 0. \quad (A.6)$$

Note that for a longitudinally oriented transmitter, in a homogeneous medium, that $\vec{E}_z \equiv 0$ which follows from Eq. (A.3) and the fact that the only non-zero component of the Hertz vector is $\pi_z^{(m)}$. Thus, in a homogeneous medium, the longitudinally oriented transmitter excites pure transverse electric (TE) waves. This is, not true, for the model in a cylindrically layered medium, for which both TE and transverse magnetic (TM) waves are excited. A detailed discussion of this case will be presented in a separate report. The EM fields are obtained by solving the exterior boundary value problem in the domain, $a \leq r \leq \infty$, for the wave equations in (A.1) and (A.2) subject to the boundary conditions in Eqs. (A.5) and (A.6).

Tool Response Formulas

Figure 13:
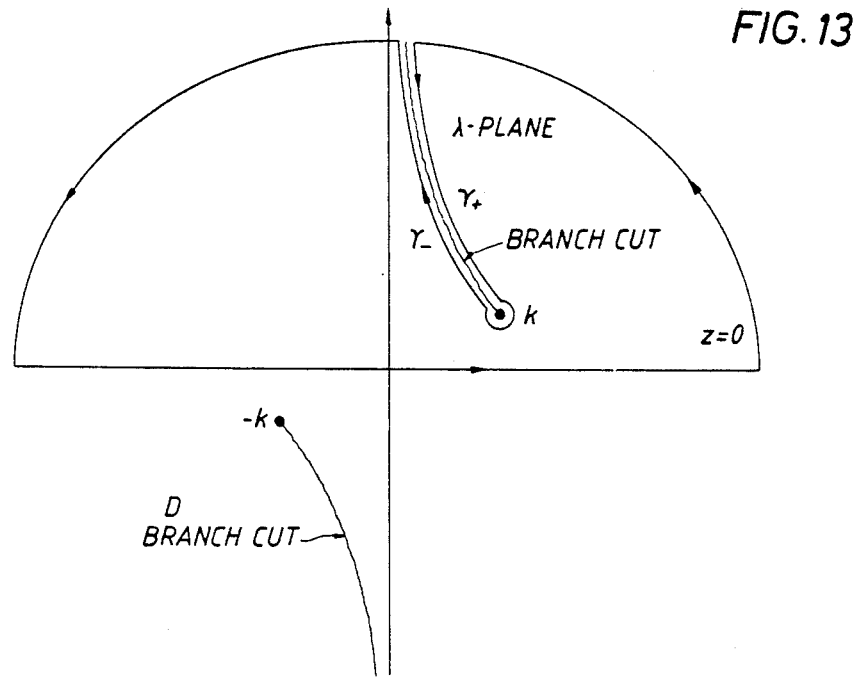
FIG. 13 illustrates a branch cut and branch line integration paths used to obtain the convergent quadrature solutions in Equations A.7 and A.9.

The wave equations discussed above were solved analytically using integral transform methods. The formal mathematical solutions involve real axis integrals over spatial transform frequencies ($\lambda$). The real axis integrals are poorly convergent. The integrands are analytic functions of $\lambda$ except for branch points at $\lambda = \pm k$. The integrands each involve a sum over order (n) of a function involving modified Bessel functions, $K_n(\lambda a)$, with complex arguments, $\gamma a = \sqrt{(\lambda a)^2 - (ka)^2}$. In a homogeneous medium, the integrands have no pole singularities. In a layered medium the poles correspond to discrete modes (e.g., bound states or waveguide modes) of the system. The poorly convergent real axis integrals are rendered exponentially convergent by choosing the branch cut shown in FIG. 13. On this branch cut, the complex function $\gamma$ is pure imaginary (the real part vanishes). Using Cauchy's theorem, the real axis integrations are replaced by two nicely convergent branch line integrals. On the branch lines, the modified Bessel function switch complex arguments are replaced by Hankel functions with real arguments which are easily computed using commercially available software. This leads to the formulas given below which are computationally simple. These formulas were derived without employing any approximations such as, e.g., saddle point expansions of the integrands and represent exact quadrature solutions of the models.

Longitudinally Oriented Transmitter

Figure 14:
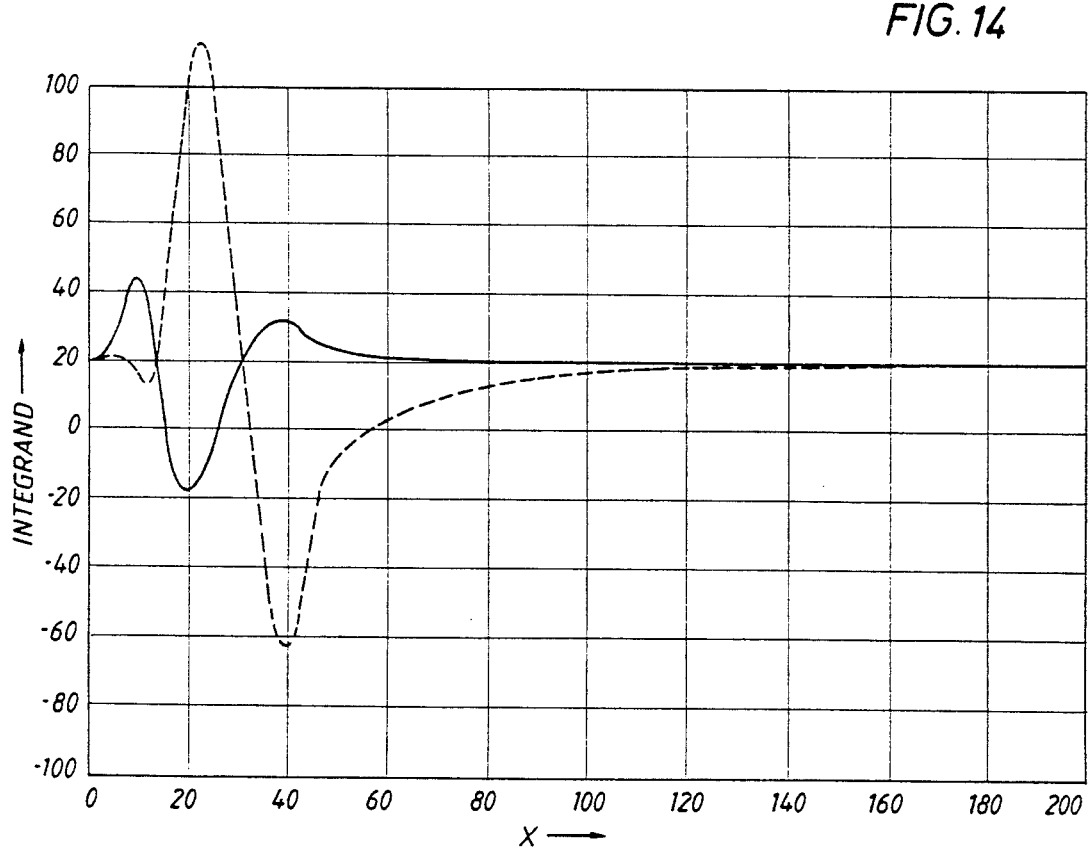
FIG. 14 illustrates a plot of complex branch cut integrand illustrating smooth behavior and rapid convergence for small z.

The magnetic field $H_z(a, \phi, z)$ on the surface of the metallic pad for a longitudinally oriented transmitter is given by the formula, $$H_z = \frac{iM_0}{\pi^3 a^3} \sum_{n=0}^{\infty} \epsilon_n \cos n\phi \int_0^\infty \frac{dx \, x G(x, ka, \vec{z})}{|H_n^{(1)'}(x)|^2}, \quad (A.7)$$

where $H_n^{(1)}(x) = J_n(x) + iY_n(x)$ are the Hankel functions, in which use the notation of Watson[10] for the Bessel functions $J_n(x)$ and $Y_n(x)$. I have introduced the Neumann function defined by, $\epsilon_n = \delta_{n,0} + 2(1. - \delta_{n,0})$, where $\delta_{n,0}$ is the well-known Kronecker delta function. The prime on the Handel function in Eq. (A.7) denotes differentiation with respect to its argument and the vertical bars denote the absolute value of the complex Hankel function. In Eq. (A.7) I have defined the function, $$G(x, ka, \vec{z}) = \frac{e^{i\sqrt{(ka)^2 - x^2}\vec{z}}}{\sqrt{(ka)^2 - x^2}}, \quad (A.8)$$

with $\vec{z} = z/a$. The integral in Eq. (A.7) was obtained by combining the two branch line integrals. The integrand is a function of the dimensionless real variable x for given values of, ka, and receiver location, (a, $\phi$, z), on the cylindrical pad. Note that for large x, the integrand converges exponentially provided that $z > 0$. The integrand is computed for each value of x by performing the summation in (A.7). The number of terms needed for convergence of the summation in (A.7) increases with x, but it has been found that no more than 30 to 40 terms are generally needed. The integrand vanishes for $x \to 0$ and as $x \to x_{max}$ where $x_{max}$ depends on primarily on the z co-ordinate of the receivers. The real and imaginary parts of the integrand are smooth functions of x as can be seen in FIG. 14 for a typical case. The integrals have been done using a simple Simpson's rule integration algorithm.

Transversely Oriented Transmitter

The magnetic field $H_\phi(a, \phi, z)$ on the surface of the metallic pad for a transversely oriented transmitter is given by the formula, $$H_\phi = \frac{iM_0}{2\pi^2 a^3} \sum_{n=0}^{\infty} \epsilon_n \cos n\phi \int_0^{\infty} dx G(x, ka, \vec{z}) \cdot [(ka)^2 U_n(x) - n^2 V_n(x)], \quad (A.9)$$

where I have defined the functions, $$U_n(x) = \frac{Im[H_{n-1}^{(2)}(x) \cdot H_{n+1}^{(2)}(x) \cdot H_n^{(1)}(x) \cdot H_n^{(1)'}(x)]}{|H_n^{(1)}(x)|^2 \cdot |H_n^{(1)'}(x)|^2}, \quad (A.10)$$

and, $$V_n(x) = \frac{Im[(H_n^{(2)}(x))^2 \cdot H_n^{(1)}(x) \cdot H_n^{(1)'}(x)]}{|H_n^{(1)}(x)|^2 \cdot |H_n^{(1)'}(x)|^2}, \quad (A.11)$$

where the dots (.) denote ordinary scalar multiplication and $Im[\ldots]$ denotes taking the imaginary part of the complex quantity in brackets. The functions $H_n^{(2)}(x)$ are Hankel functions which are the complex conjugates of the functions $H_n^{(1)}(x)$ defined above. It is easy to show that the integrand in (A.9) has an integrable singularity as $x \to 0$. The singularity comes from the small x behavior of the $n=0$ term enclosed in brackets in (A.9). This poses no problems for the numerical integration since for small x the integral can be done analytically, and this contribution (which is found to be negligible for $x_{min}$ sufficiently small) added to the numerical integration in the interval from $x_{min}$ to $x_{max}$.

APPENDIX B

Heuristic Picture of Azimuthal Wave Propagation

This Appendix provides a heuristic picture of the azimuthal wave propagation discussed in this report. First, however, I define exactly how the apparent traveltimes, $t_{pla}$ and total attenuations, EATT, are computed from the formulas in Appendix A. The heuristic picture explains the computed results for a longitudinally oriented transmitter in terms of planewaves propagating along and around the borehole. This simple model is only approximate and phenomenological. The detailed formulas in Appendix A are used to compute phase shifts and attenuations and also determine the receiver positions for which the planewave approximation is valid.

Consider a homogeneous, isotropic, and non-magnetic medium with complex propagation constant, $k = k' + ik''$. The complex propagation constant is given by $k = \omega\sqrt{\mu_0 \epsilon}$ where $\epsilon = \kappa\epsilon_0(1 + \tan\delta)$ is the complex dielectric permittivity, $\kappa$ is the relative dielectric constant, $\tan\delta$ is the loss tangent, and $\epsilon_0$ and $\mu_0$ are the permittivity and permeability of a vacuum. The true traveltivity, $t_{pl}$, of this medium are defined as the inverse phase velocities (often referred to as slowness in the literature on seismic wave propagation) of a planewave propagating in the medium, i.e., $$t_{pl} = \frac{k' 10^9}{\omega}, \quad (B.1)$$

where the factor of $10^9$ is introduced to express $t_{pla}$ in units of ns/m and $\omega = 2\pi f$ is the angular frequency of the wave. The attenuation, a, of a planewave in the medium is given by, $$A = 8.686 k'', \quad (B.2)$$

in units of dB/m. Knowledge of $k'$ and $k''$ provides a complete description of the dielectric properties of a homogeneous and isotropic medium.

Computation of Apparent Traveltimes And Total Attenuations

The apparent traveltimes, $t_{pla}$, are computed from the equation, $$t_{pla} = \frac{\Delta\Phi}{L\omega} 10^9, \quad (B.3)$$

where $\Delta\Phi$ is the phase shift in radians of the magnetic field between a pair of receivers $R_1$ and $R_2$ located at positions $(\phi_1, z_1)$ and $(\phi_2, z_2)$, respectively, on the antenna pad. The quantity, L, is the separation between the receivers and is defined by, $$L = \begin{cases} a(\phi_2 - \phi_1), & \text{(azimuthal waves)} \\ z_2 - z_1. & \text{(longitudinal waves)} \end{cases} \quad (B.4)$$

For the azimuthal wave propagation considered in this report, the receives have the same z co-ordinates, i.e., $z_1 = z_2 = z$, whereas for longitudinal wave propagation the receivers are at the same azimuthal positions, i.e., $\phi_1 = \phi_2 = \phi$. In the above equation, a, is the radius of curvature of the EPT antenna pad (0.1016 m). The phase shifts, $\Delta\Phi$, in (B.3) are computed, for a longitudinally oriented transmitter, from the equation $$\Delta\Phi = Im \ln \frac{H_z(\phi_2, z)}{H_z(\phi_1, z)}, \quad (B.5)$$

the azimuthal wave propagation and from an analogous equation, $$\Delta\Phi = Im \ln \frac{H_z(\phi, z_2)}{H_z(\phi, z_1)}, \quad (B.6)$$

for longitudinal wave propagation.

In applying Eq. (B.6) to compute the phase shifts for longitudinal waves propagated by the EPT-G Endfire tool, note that the configuration of the antennas is such that $\phi = 0$. The magnetic fields in Eqs. (B.5) and (B.6) are computed from the formula in Eq. (A.7) for a longitudinally oriented dipole transmitter and receivers. For studying longitudinal wave propagation for a transversely oriented transmitter and receivers, the magnetic field $H_\phi(\phi, z)$ computed from Eq. (A.9) is used in (B.6) to compute the phase shifts. The azimuthal waves are not excited by a transversely oriented transmitter so that (B.5) is not used for this orientation.

The total attenuations are computed, for a longitudinally oriented transmitter, from the equation $$EATT = \frac{8.686}{L} Re \ln \frac{H_z(\phi_1,z)}{H_z(\phi_2,z)}, \qquad (B.7)$$

for azimuthal wave propagation, and $$EATT = \frac{8.686}{L} Re \ln \frac{H_z(\phi, z_1)}{H_z(\phi, z_2)}, \qquad (B.8)$$

for longitudinal wave propagation.

Heuristic Planewave Model

In a homogeneous medium, it is possible to heuristically explain the results of the computations documented in this report for a longitudinally oriented transmitter. To be consistent with the detailed computations, the heuristic model must account for the following findings: (1) the apparent traveltimes ($t_{pla}$) for both azimuthal and longitudinal wave propagation, computed as described above, are to within a good approximation equal to the true formation traveltimes ($t_{pl}$) for the range of k values found in reservoir rocks, (2) the spreading losses $A_s$, for both azimuthal and longitudinal wave propagation, are to within a good approximation, independent o the propagation constant k of the medium. Furthermore, the spreading loss for azimuthal wave propagation depends on the positions of the receivers relative to the transmitter, i.e., $A_s = A_s(\phi_1, \phi_2, z)$. I now demonstrate that the above findings are, to within a good approximation, consistent with the model, $$H_z(a, \phi, z) \simeq |H_z(\phi, z)| e^{ikz + ika\phi}, \qquad (B.9)$$

where $|H_z(\phi, z)|$ the amplitude of the planewave is assumed to be independent of the propagation constant k of the medium. In order to demonstrate that this simple model is consistent with our detailed modeling results, it is useful to compute the apparent traveltimes $t_{pla}$ and total attenuations EATT for the magnetic field in (B.9). On substituting (B.9) into (B.3), one finds for both longitudinal and azimuthal wave propagation that, $$t_{pla} = \frac{k' 10^9}{\omega} \equiv t_{pl}, \qquad (B.10)$$

where Eqs. (B.4), (B.5) and (B.6) and Eq. (A.1) have been used to obtain the last equality. Thus, the heuristic planewave model is consistent within finding no. (1) in the preceding paragraph. Likewise on computing the total attenuation for both longitudinal and azimuthal wave propagation for the magnetic field in Eq. (B.9), one finds that for azimuthal wave propagation, $$EATT = 8.686k'' + \frac{8.686}{L} Re \ln \frac{|H_z(\phi_1,z)|}{|H_z(\phi_2,z)|}, \qquad (B.11)$$

and similarly for longitudinal wave propagation, $$EATT = 8.686k'' + \frac{8.686}{L} Re \ln \frac{|H_z(\phi, z_1)|}{|H_z(\phi, z_2)|}. \qquad (B.12)$$

On recalling Eq. (B.2), one can write Eqs. (B.11) and (B.12) in the same form, i.e., $$EATT = A + A_s, \qquad (B.13)$$

where I have defined the spreading loss $A_s$, i.e., from (B.11) for azimuthal wave propagation, $$A_s = \frac{8.686}{L} Re \ln \frac{|H_z(\phi_1,z)|}{|H_z(\phi_2,z)|}, \qquad (B.14)$$

and similarly for longitudinal wave propagation, $$A_s = \frac{8.686}{L} Re \ln \frac{|H_z(\phi, z_1)|}{|H_z(\phi, z_2)|}, \qquad (B.15)$$

in units of dB/m. We see from the above two equations that $A_s$ is independent of k and, moreover, from Eq. (B.14) that the spreading loss for azimuthal wave propagation depends on receiver positions, i.e., $A_s = A_s(\phi_1, \phi_2, z)$. Thus, I have demonstrated the consistency of the heuristic model with finding no. (2) discussed in the preceding paragraph.

REFERENCES

2. R. Freedman and J. P. Vogiatzis, "Theory of Microwave Dielectric Constant Logging Using The Electromagnetic Propagation Method," *Geophysics* (May, 1979) 44, No. 5, 969–986.
3. W. C. Chew and Stanley C. Gianzero, "Theoretical Investigation of the Electromagnetic Propagation Tool," *Trans., IEEE, On Geoscience And Remote Sensing* (1981) GE-19, No. 1, 1–7.
4. K. Safinya, T. Habashy, C. Randall, B. Clark, and A. Perez-Falcon, "Experimental And Theoretical Study Of The Electromagnetic Propagation Tool In Layered And Homogeneous Media," *SPEFE* (Sept. 1987) 289–302.
5. Arnold Sommerfeld, "*Partial Differential Equations In Physics,*" Academic Press, New York and London (1949).
6. J. A. Koing, "*Theory of Electromagnetic Waves,*" Wiley Interscience (1975).
9. Brian Clark, "Electromagnetic Logging Apparatus Using Vertical Magnetic Dipole Slot-Antennas," U.S. Pat. No. 4,704,581 (1987).
10. G. N. Watson, "*A Treatise On The Theory Of Bessel Functions,*" Cambridge University Press, London (1945).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Apparatus disposed on a curved outer surface of a sonde adapted to be disposed in a borehole for transmitting electromagnetic waves from said sonde into a formation traversed by said borehole and for receiving said electromagnetic waves from said formation, comprising:

first means for transmitting longitudinal electromagnetic waves and azimuthal electromagnetic waves into said formation, said azimuthal electromagnetic waves propagating azimuthally in said formation;

second means for receiving said longitudinal electromagnetic waves; and third means for receiving said azimuthal electromagnetic waves.

2. The apparatus of claim 1, wherein said third means comprises at least an additional pair of receivers, the receivers of the additional pair being azimuthally displaced by angles phi-3 and phi-4, respectively, from said first means, each of the additional pair of receivers being longitudinally displaced by a value Z1 from said first means.

3. The apparatus of claim 2, wherein said first means comprises a transmitter disposed on a longitudinal axis located on said curved surface of said sonde, said transmitter including a longitudinally oriented antenna element.

4. The apparatus of claim 3, wherein said second means comprises at least a pair of receivers, said pair of receivers being disposed on said longitudinal axis and being displaced along said longitudinal axis by values Z2 and Z3 from said transmitter.

5. The apparatus of claim 1, wherein said first means comprises:
   first transmitter means disposed on a first longitudinal axis located on said curved surface of said sonde for transmitting said longitudinal waves; and
   second transmitter means disposed on a second longitudinal axis located on said curved surface of said sonde for transmitting said azimuthal waves, said second longitudinal axis being displaced azimuthally by an angle phi-4 from said first longitudinal axis, said second transmitter including a longitudinally oriented antenna element and being longitudinally displaced by a value Z1 from said first transmitter means.

6. The apparatus of claim 5, wherein said second means comprises at least a pair of receivers disposed on said first longitudinal axis and displaced along said first longitudinal axis by values Z3 and Z4 from said first transmitter means.

7. The apparatus of claim 5, wherein said third means comprises at least an additional pair of receivers disposed on third and fourth longitudinal axes, the third and fourth longitudinal axes of said additional pair of receivers being azimuthally spaced from said second longitudinal axis of said second transmitter means by angles (phi-4 − phi-3) and (phi-4 + phi-3), respectively, said additional pair of receivers being longitudinally displaced by a value Z2 from said first transmitter means.

8. The apparatus of claim 7, wherein said additional pair of receivers measures a phase shift and an attenuation of said azimuthal waves which propagate between said additional pair of receivers.

9. The apparatus of claim 8, wherein said phase shift is given by the expression:

$$\Delta\Phi \simeq a(\phi_2 - \phi_1)k'$$

where "delta phi" is said phase shift, "a" is a radius of curvature of said curved surface of said sonde, "phi$_2$" is equal to the angle (phi-4 + phi-3), "phi$_1$" is equal to the angle (phi-4 − phi-3), and "k'" is a real part of a propagation constant of said formation.

10. The apparatus of claim 9, wherein said attenuation is given by the expression:

$$EATT \simeq 8.686k'' + A.(\phi_1, \phi_2, z)$$

where "EATT" is said attenuation, k" is an imaginary part of said propagation constant of said formation, "As" is a spreading loss, and "z" is equal to said value Z2 minus said value Z1.

11. The apparatus of claim 10, wherein said at least an additional pair of receivers of said third means are longitudinally oriented receivers, and wherein a signal received by said at least an additional pair of receivers is proportional to a z-component of a magnetic field at said receivers, the z-component of said magnetic field being given by the following expression:

$$H_z = \frac{iM_0}{\pi^3 a^3} \sum_{n=0}^{\infty} \epsilon_n \cos n\phi \int_0^{\infty} \frac{dx\, xG(x,ka,\vec{z})}{|H_n^{(1)'}(x)|^2}$$

where "Hz" is the z-component of said magnetic field at (a, phi, z) and "phi" is equal to either "phi$_2$" or "phi$_1$", $H_n(x) = J_n(x) + iY_n(x)$ are Hankel functions, and G" is defined by the following expression where "z bar" = z/a and k = k' + ik":

$$G(x,ka,\vec{z}) = \frac{e^{i\sqrt{(ka)^2 - x^2}\vec{z}}}{\sqrt{(ka)^2 - x^2}}$$

12. The apparatus of claim 2, wherein said at least an additional pair of receivers measures a phase shift and an attenuation of said azimuthal waves which propagate between said additional pair of receivers.

13. The apparatus of claim 12, wherein said phase shift is given by the expression:

$$\Delta\Phi \simeq a(\phi_2 - \phi_1)k'$$

where "delta phi" is said phase shift, "a" is a radius of curvature of said curved surface of said sonde, "phi$_2$" is equal to the angle (phi-4), "phi$_1$" is equal to the angle (phi-3), and "k'" is a real part of a propagation constant of said formation.

14. The apparatus of claim 13, wherein said attenuation is given by the expression:

$$EATT \simeq 8.686k'' + A.(\phi_1, \phi_2, z)$$

where "EATT" is said attenuation, k" is an imaginary part of said propagation constant of said formation, "As" is a spreading loss, and "z" is equal to said value Z1.

15. The apparatus of claim 14, wherein said at least an additional pair of receivers of said third means are longitudinally oriented receivers, and wherein a signal received by said at least an additional pair of receivers is proportional to a z-component of a magnetic field at said receivers, the z-component of said magnetic field being given by the following expression:

$$H_z = \frac{iM_0}{\pi^3 a^3} \sum_{n=0}^{\infty} \epsilon_n \cos n\phi \int_0^{\infty} \frac{dx\, xG(x,ka,\vec{z})}{|H_n^{(1)'}(x)|^2}$$

where "Hz" is the z-component of said magnetic field at (a, phi, z) and "phi" is equal to either "phi$_2$" or "phi$_1$", $H_n(x) = J_n(x) + iY_n(x)$ are Hankel functions, and G" is defined by the following expression where "z bar" = z/a and k = k' + ik":

$$G(x,ka,\vec{z}) = \frac{e^{i\sqrt{(ka)^2-x^2}z}}{\sqrt{(ka)^2-x^2}}$$

16. A method practiced by a sonde adapted to be disposed in a borehole for determining the azimuthal microwave dielectric properties of a formation traversed by said borehole, the sonde including a curved antenna pad, a longitudinally oriented transmitter element disposed on the pad for transmitting azimuthal waves, and at least a pair of receiver elements disposed on the pad and azimuthally spaced by angles phi-2 and phi-1, respectively, from the transmitter element for receiving the azimuthal waves, where phi-2 is greater than phi-1, comprising the steps of:

transmitting the azimuthal waves from said transmitter element;
measuring a phase shift of the azimuthal waves between the pair of receiving elements; and
determining a real part of a propagation constant (k') of said formation from said phase shift.

17. The method of claim 16, further comprising:
measuring an attenuation (EATT) of the azimuthal waves between the pair of receiver elements; and
determining an imaginary part of a propagation constant k") of said formation from said attenuation, the real part and the imaginary part of the propagation constant of said formation collectively determining the azimuthal microwave dielectric properties of said formation.

18. The method of claim 17, wherein said real part of the propagation constant (k') is determined by the following expression:

$k' = (\text{delta-phi})/[a(\text{phi-2-phi-1})]$, where "a" is a radius of curvature of said curved antenna pad.

19. The method of claim 18, wherein said at least a pair of receiver elements are longitudinally spaced from said transmitter element by a value Z, and wherein said imaginary part of the propagation constant (k") is determined by the following expression:

$k'' = [\text{EATT} - As(\text{phi-1, phi-2, z})]/8.686$, where As is the spreading loss as a function of the angle phi-1, the angle phi-2, and z, where z is said value Z, said azimuthal microwave dielectric properties (k) of said formation being determined form the following further expression:

$k = k' + i k''$

20. Apparatus disposed on an outer surface of a sonde adapted to be disposed in a borehole for transmitting electromagnetic waves from said sonde into a formation traversed by said borehole and for receiving said electromagnetic waves from said formation, comprising:

first means for transmitting azimuthal electromagnetic waves into said formation, said azimuthal electromagnetic waves propagating azimuthally in said formation; and
second means for sensing said azimuthal electromagnetic waves propagating in said formation.

21. Apparatus adapted for transmitting electromagnetic waves into a formation traversed by a borehole and for receiving said electromagnetic wave from said formation, comprising:

means for transmitting an azimuthally propagating electromagnetic wave into said formation; and
means for receiving said azimuthally propagating electromagnetic wave from said formation.

22. A method of transmitting electromagnetic waves into a formation traversed by a borehole and of receiving said electromagnetic waves from said formation, comprising the steps of:

transmitting an azimuthally propagating electromagnetic wave into said formation; and
receiving said azimuthally propagating electromagnetic wave from said formation.

23. Apparatus adapted for receiving electromagnetic waves from a dielectric medium, comprising:

a curved pad, said dielectric medium surrounding said curved pad; and
receiving means disposed on said curved pad for receiving an azimuthally propagating electromagnetic wave from said dielectric medium.

24. A method of assisting in the determination of a dielectric property of a dielectric medium, comprising the step of:

transmitting an azimuthally propagating electromagnetic wave into said dielectric medium;
receiving said azimuthally propagating electromagnetic wave from said dielectric medium; and
analyzing said azimuthally propagating electromagnetic wave to determine an azimuthal dielectric property of said dielectric medium thereby assisting in the determination of the dielectric property of said dielectric medium.

* * * * *